UNITED STATES PATENT OFFICE 2,484,146

LUBRICATING COMPOSITION

Sidney J. Barber, Philadelphia, and James T. Eaton, Hatboro, Pa., assignors to E. F. Houghton & Co., Philadelphia, Pa., a corporation of Pennsylvania No Drawing. Application April 7, 1945, Serial No. 587,208

13 Claims. (Cl. 252—49.9)

The present invention relates to novel lubricants and bases therefor, for example, materials to be used in the forming and machining of metals, such as cutting oils and drawing oils and pastes, and as extreme pressure lubricants.

A fatty oil and combinations of fatty oils have been used in the past as additives to metal-forming and machining oils but such materials do not impart the desired properties to the metal-forming and machining oils. It is also generally known that sulphurized fatty and mineral oils are useful in cutting oils but there are, however, certain objections to the use of these materials since they cause staining of the metals being processed, have an objectionable odor, and have little sales appeal due to their very dark appearance.

It is also known that fatty acids and fatty esters when containing substituted chlorine are effective materials from the standpoint of increasing the load-carrying ability of mineral oils and combinations of mineral oils with fatty acids, thus forming therewith extreme pressure lubricants. Due to their high reactivity, however, such chlorine compounds can be used only in small quantities and under conditions where this reactivity is no serious hindrance.

One object of the invention is to provide a composition containing an additive possessing lubricating properties and which imparts to the composition the various beneficial properties previously imparted to such compositions by the use of the available additives but which possesses none of the disadvantages of such additives.

A further object of the invention is to provide a lubricating composition comprising a relatively inexpensive, novel product of the fatty phosphate type either alone or in admixture in small or large concentrations with other materials.

Still another object of the invention is to provide a lubricating composition containing a phosphated amine condensation product which lubricating composition may be used as a lubricating, drawing, or cutting oil, or a grease such as lime or aluminum or other metal base thereto by said condensation product improved oiliness and film-strengthening qualities and other desirable properties, without any deleterious effect on the stability of the composition and without rendering the composition corrosive.

Other objects will be apparent from a consideration of this specification and the claims.

The phosphated amine condensation product of the present invention is a phosphate salt of a condensation product of an amine and a higher fatty acid, the amine being selected from the group consisting of polyalkyleneamines containing at least three amino groups, an alkylolamine having at least two hydroxyl groups and an alkylolpolyamine, the alkylene and alkylol units containing 2 to 4 carbon atoms and the higher fatty acid being selected from the group consisting of the saturated fatty acids whose formulae are represented by $C_nH_{2n+1}COOH$ where $n$ is at least 11, oleic, linoleic, and ricinoleic acids. The phrase "poly" as used herein with reference to the amines includes the presence of two or more basic nitrogens.

In preparing the phosphated amine condensation product, the amine and fatty acid are first reacted to form a condensation product which is then reacted with the phosphating agent to form the phosphate salt. The condensation product between the amine and the fatty acid is the result of the reaction of 1 mol of the amine and 2 mols of the fatty acid with the splitting off of at least two molecules of water. As will be hereinafter discussed, the condensate obtained as the result of the splitting off of two molecules of water is a non-cyclic ester or amide, whereas with certain types of amines, if the reaction is sufficiently drastic to split off three molecules of water, the condensate formed is a cyclic compound. In order to form the cyclic compound by the splitting off of three molecules of water, the amine must contain one —NH₂ and one —NH group, or two —NH₂ groups, or an NH₂ group and an —OH group separated by two carbon atoms. In the first two cases, an imidazoline is obtained and in the third case an oxazoline is formed.

As stated above, the amine is selected from the group consisting of polyalkyleneamines containing at least three amino groups, an alkylolamine having at least two hydroxyl groups and an alkylolpolyamine, the alkylene and alkylol units containing from 2 to 4 carbon atoms. Hence, the use of amines, such as tertiary amines, is not contemplated unless the molecule contains an hydroxyl and an NH group or two hydroxyl groups or two NH groups, since, without one of these groupings, the condensation with two mols of the fatty acid is not possible. Preferably, the amine will be an ethylene or propylene derivative having the group —CH₂·CHR·N< where R is selected from the group consisting of hydrogen or a methyl group, and therefore, the amines are advantageously selected from the group consisting of the polyethyleneamines and polypropyleneamines having at least three amino groups, the ethanol and propanol amines having at least two hydroxyl groups and the ethanol and propanol polyamines.

Examples of a few of the amines that are applicable for use in forming the condensation product with the fatty acid are the following: diethylene triamine; tetraethylenepentamine; triethylenetetramine; dipropylene triamine; triethanolamine; diethanolamine; dipropanolamine; tripropanolamine; tri(hydroxy methyl) methylamine; 2-methyl, 2-amino, 1,3-propandiol; 2-ethyl, 2-amino- 1,3-propandiol; 2-propyl, 2-amino, 1,3-propandial; hydroxy ethyl ethylene diamine; hydroxy ethyl diethylene triamine; trihydroxy ethyl ethylene diamine; and dibutanolamine.

Examples of acids having a formula represented by $C_nH_{2n+1}COOH$, where $n$ is at least 11 are the following: Palmitic acid, stearic acid, myristic acid, lauric acid, and behenic acid, and, as stated, unsaturated acids such as oleic, linoleic, and ricinoleic acids may also be employed. Pure acids need not be employed and the mixtures of acids present in or derived from the various animal, vegetable, and fish fats, oils, and waxes may be employed, for example, talloil, tallow, cocoanut oil, corn oil, fish oil, peanut oil, redoil, olive oil, and castor oil.

In order to form the condensate, the amine and fatty acid must be reacted at an elevated temperature in order to split off the necessary amount of water, since if the amino compound and the acid were merely reacted at room temperature an addition product, namely, an amine soap would be formed and this addition product would be decomposed by the phosphating agent. The temperature, and to some extent the time, of the reaction will determine whether the formation of the non-cyclic condensate obtained by the removal of two molecules of water or the formation of cyclic condensates obtained by the removal of three molecules of water is favored and mixed products containing both types of condensates are applicable for use in accordance with the invention. In any particular case, the condensation reaction will be conducted under such conditions as are necessary to provide the splitting off of the necessary water to form the condensate or mixture of condensates desired. The temperature will depend to some extent on the particular amine employed and, in general, a temperature between about 135° C. and 175° C., preferably between 150° C. and 175° C., will favor the formation of the non-cyclic condensate, whereas temperatures above about 180 C., preferably above 200° C., will favor the formation of the cyclic condensate. When a cyclic condensate is desired, the upper limit of temperature is not important but a temperature of above about 250° C. will not usually be employed. If desired, the condensation can be conducted under a vacuum in which event the temperature of treatment may be reduced, for example, about 25° C. more or less.

While the reaction to form the condensate is between 1 mol of the amine and two mols of the fatty acid, an excess of either reactant may be present if desired for any reason. Furthermore, so long as there is sufficient of the condensate obtained by the splitting off of at least two molecules of water present in the mixture to be effective, the reaction need not be carried to the point where all of the amine and fatty acid has been condensed and in this case the uncondensed products will merely function as diluents.

In the preferred embodiment, the amine and the fatty acid are mixed in the molecular ratio of 1 mol of the former to 2 mols of the latter and the reaction is conducted to the point where two molecules of water have been split off when the non-cyclic condensate is desired and to the point where three molecules of water have been split off when the cyclic condensate is desired. If desired, however, the reaction can be carried out in steps, for example, an initial reaction can be conducted using 1 mol of acid per mol of the amine. In the preparation of the non-cyclic condensate, the second mol of fatty acid may be added before or after the subjection of the mixture to sufficient temperature to remove one molecule of water. If one molecule of water has been removed prior to the addition of the second mol of acid, then it is necessary to heat the mixture again after the addition of the acid to remove the second mol of water. In the preparation of the cyclic condensate, the second mol of acid can be added before any water has been split off or after one or two molecules of water have been removed from the product. When the condensate is formed with only one mol of acid but by the removal of two molecules of water, a cyclic compound is formed before the second mol of acid is added. In any case, however, where a cyclic compound is desired and where the acid is added in two steps, it is necessary after the addition of the second mol of acid to condense the reacting mixture so that a total of three molecules of water will have been removed. Furthermore, if desired, the non-cyclic condensate can be first formed and then converted into the cyclic compound by the removal of an additional mol of water.

After the condensation product is formed, it is reacted with a phosphating agent to form the phosphated amine condensate and the phosphating agent reacts with the amine condensate to form a salt by addition in the same manner as the usual amine salts are formed. The phosphated compound formed may be monohydrogen phosphate or a dihydrogen phosphate or a mixture of the two, and all of these are effective for the purposes of the present invention. Furthermore, the product may contain an amount of the unreacted amine condensate. The phosphating agent is preferably phosphoric acid, for example, technical 85% phosphoric acid although more dilute acids may be employed if desired, for example 70% phosphoric acid. In general, the amount of phosphoric acid employed will be between about 1/3 mol to about 1 mol of $H_3PO_4$ for each mol of condensate, but the amount used may be varied as desired and an excess is not disadvantageous. Advantageously, the phosphoric acid is added gradually to the condensate in a manner to avoid local heating, and while the reaction will progress satisfactorily at room temperature, it is preferably heated at 60° C. to facilitate the reaction. If the product is to be used in a composition containing water, the phosphated composition need not be further treated. If, however, it is to be used in an anhydrous composition, for example, one containing a hydrocarbon such as mineral oil, the phosphated amine condensation product is advantageously heated above the boiling point of water, for example, to about 220° C., to remove the water. The reaction between the amine condensation product and the phosphating compound may be carried out in the presence of a solvent or a diluent if desired; for example, the condensation product may be dissolved in the mineral oil which is to form the base of the lubricating composition and the phosphating agent may then be added thereto to form the phosphated product. If such a procedure is followed, the product is subsequently heated to remove the water therefrom.

While the invention is not to be limited to any particular theory of the reaction or to any particular structural formulae of the condensate or of the phosphated product, the following equations are given in explanation of the probable or possible course of the reactions. In these equations, diethylene triamine is employed as a typical amine and R in the formula represents the fatty acid nucleus, and while the phosphated compounds are represented as the dihydrogen phosphates, it is to be understood the product may be the monohydrogen phosphate or mixtures of the mono- and dihydrogen phosphates.

(a) The formation of a non-cyclic condensate in one step:

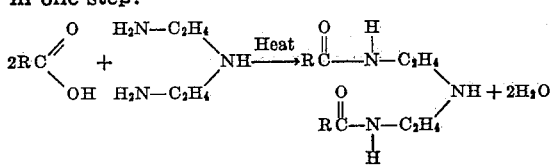

Diethylene triamine      Di (acylimidoethyl) amine (b) The formation of the phosphate salt of the non-cyclic condensate:

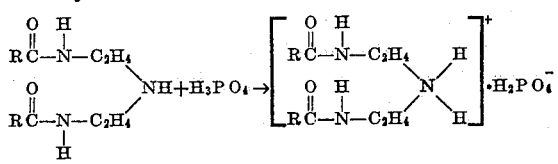

Di (acylimidoethyl) ammonium dihydrogen phosphate (c) The formation of a non-cyclic condensate in two steps:

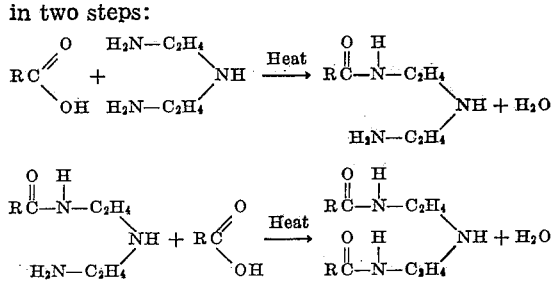

Di (acylimidoethyl) amine which may then be reacted with $H_3PO_4$ in accordance with Equation (b)

(d) The formation of a cyclic condensate in one step:

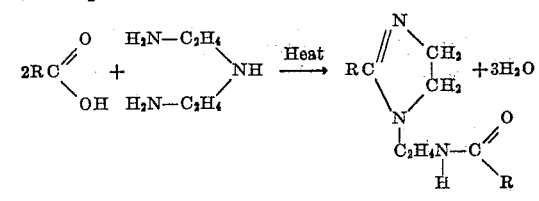

2-alkyl, 3-acylimidoethyl imidazoline (e) The formation of the phosphate salt from the cyclic condensate:

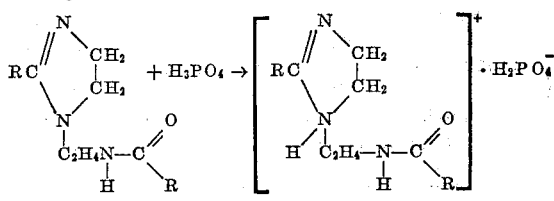

Dihydrogen phosphate salt of 2 alkyl 3 acylimidoethyl imidazoline (f) The formation of a cyclic condensate in two steps (alternate 1).

The reaction illustrated in Equation (a) is first carried out to form:

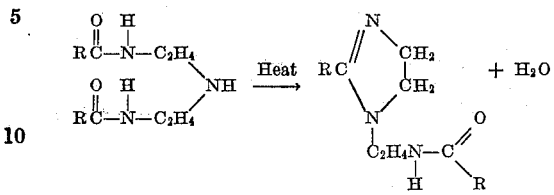

2-alkyl, 3-acylimidoethyl imidazoline which may be reacted with $H_3PO_4$ in accordance with Equation (e)

(g) The formation of a cyclic condensate in two steps (alternate 2).

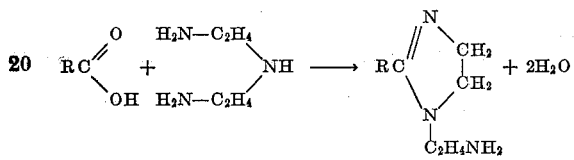

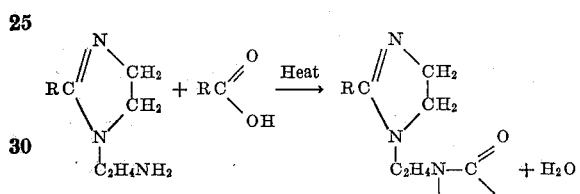

2-alkyl, 3-acylimidoethyl imidazoline which be reacted with $H_3PO_4$ in accordance with Equation (c)

(h) The formation of a cyclic condensate in three steps.

The reactions illustrated in Equation (c) are conducted followed by the equation illustrated in (f). The compound formed may then be reacted with $H_3PO_4$ in accordance with Equation (e).

As above stated, a non-cyclic ester instead of the non-cyclic amide illustrated or an oxazoline compound instead of the imidazoline compound illustrated may be formed depending on the amine used in the reaction, and reactions with the various amines can be illustrated by corresponding equation.

The phosphated amine condensation products of the present invention possess lubricating properties and may be used wherever these properties are desired. While they may be used as lubricants without admixture with other materials, they will generally be associated with other materials. The phosphated products are soluble in both mineral and fatty oils and confer on these materials excellent film-strengthening properties and, therefore, may serve as an additive to these materials when an extreme pressure lubricant is desired. Furthermore, they may be mixed with water to form a drawing paste of excellent lubricity and may be included in cutting or drawing oils to provide lubricating properties thereto. When the phosphated amine condensation products are mixed with greases, such as the ordinary types including lime and aluminum base greases, the products formed have improved properties as compared to the properties of the usual greases so far as lubricity is concerned, although the melting points of the greases may be reduced to some extent.

In the preparation of cutting or drawing oils, the phosphated amine condensation product may be added in the desired amount, for example from about 2% to about 25%, preferably from about 5% to about 15%, to mineral oil or to a mixture of mineral oil and a saponifiable oil such as lard oil. As is the usual practice with cutting oils, the saponifiable oil will generally not exceed 50% based on the mineral oil. In a typical example, a satisfactory cutting or drawing oil may be prepared by mixing about 10% of the phosphated amine condensation product with about 70% of 100 seconds mineral oil and about 20% of lard oil.

In the preparation of a drawing paste, from about 5% to about 50% of the phosphated amine condensation product is formed into a paste with water in the same manner as the usual drawing pastes are produced and such pastes are included herein in the term "metal-forming lubricants."

When a lubricating oil is desired, the phosphated amine condensation product by itself may be employed or it may be mixed with any desired amount of lubricating oil. Generally, however, from the standpoint of economy, it will be desirable to mix the phosphated amine condensation product in an amount between about 2% and 15% with a lubricating mineral oil of a suitable viscosity. This amount of the condensation product will provide an extreme pressure lubricant of excellent properties. In the production of a grease, using the phosphated amine condensation product, the phosphated amine condensation product is mixed with the usual ingredients such as mineral oil and a gelling agent, for instance, a metal soap, such as an alkali metal, alkaline earth metal, or aluminum soap. In general, greases contain from 65% to 95% of mineral oil with which has been admixed sufficient metal soap to form a gel, for example, 35% to 5% of the metal soap. The amount of phosphated amine condensation product added to the grease may vary widely and is generally between 5% and 20%, preferably between 3% and 10%.

The preparation of the amine condensates and their conversion into the phosphated products of the invention will now be described in greater detail by means of the following examples in which the properties and effectiveness of some of the representative ones are illustrated. All parts are by weight unless otherwise stated. It will be understood that our invention is not limited to the use of these particular compounds since the examples are merely given for purposes of illustration.

*Example A*

570 parts of oleic acid are heated with 150 parts of triethanolamine at 300° F. to 310° F. until two molecules of water have split out. The reaction is considered substantially complete when the free fatty acid content, calculated as oleic acid and titrated to phenolphthalein end point, is less than 5%.

*Example B*

600 parts of distilled talloil are heated with 105 parts of diethylenetriamine at 300° F. until two molecules of water have been split out.

*Example C*

2 mols of lauric acid are heated with 1 mol of hydroxy ethyl ethylene diamine at 350° F. to 450° F. until 2 mols of water have been split out. The resulting product in this case will be a mixture of imidazoline ester and amide ester.

*Example D*

600 parts of distilled talloil fatty acids and 105 parts of diethylene triamine are heated up to 250° C. and held at this temperature until approximately 3 mols of water have been eliminated. The resulting product is largely the imidazoline amide.

*Example I*

600 parts of the condensation product between one mol of triethanolamine and two mols of oleic acid, obtained according to Example A, are treated by the slow addition of 106 parts of technical 85% phosphoric acid. The addition is carried out slowly in order to avoid excessive local heating and after the reaction has been completed, the entire reaction mixture is brought to a temperature of 220° F. and heated until water is no longer evolved. The resulting product is an extremely viscous oil which is easily soluble in both mineral and fatty oils and confers upon these materials excellent film-strengthening properties.

*Example II*

425 parts of an amide-imidazoline type condensate are prepared from talloil and diethylenetriamine as described in Example D (supra). This condensation product is dissolved in 500 parts of 100 seconds viscosity neutral pale mineral oil and treated at room temperature with 75 parts of 85% technical phosphoric acid. After the phosphoric acid has been added, the mixture is heated at a temperature of 220° F. until substantially all water has been removed. The resulting product is an amber colored liquid which, when dissolved in a concentration of 3% in a neutral 100 seconds pale mineral oil, gives this oil sufficient film strength to enable it to carry a full load on the Cornell machine of 4,500 pounds with a torque reading of 50 maximum.

*Example III*

950 parts of the amine diester formed from distilled talloil and triethanolamine according to the method described in Example A (supra) are treated with 50 parts of 85% phosphoric acid. The resulting product is heated at a temperature of 220° F. until the water formed has been removed. The phosphated product is an amber colored oil which is very viscous but which is readily soluble in both mineral and fatty oils. A 10% dilution of this material in 100 seconds neutral pale oil carried a full load on the Cornell machine with a maximum torque reading of 81.

*Example IV*

425 parts of the diamide amine prepared from distilled talloil and diethylene triamine according to Example B (supra) are diluted with 500 parts of neutral 100 seconds pale oil and treated with 75 parts of technical 85% phosphoric acid in the same way as outlined in the above examples. The resulting product is a brown oil which is easily soluble in both fatty and mineral oils. In a concentration of 10% in neutral pale oil, it gave a torque reading of 30 in a Cornell test under a jaw load of 2,500 pounds.

Example V 900 parts of tallow fatty acids are treated with 150 parts of crude triethanolamine according to the method described in Example A (supra) to produce an amine diester. The condensation product is reacted upon with 10% of its weight of 85% technical phosphoric acid in the same way as outlined in the examples above. The resulting product is a very viscous oil which is easily soluble in mineral oils and, in a concentration of 20% in 100 seconds neutral pale oil, carried a full load on the Cornell machine of 4,500 pounds with a torque reading of 48.

Example VI 100 parts of the product, prepared from talloil and triethanolamine according to the procedure given in Example A (supra) and subsequently phosphated as desired in Example III are slowly diluted with good stirring with 400 parts of water. The resulting product is a buff colored paste which has excellent lubricity and is useful as a drawing lubricant.

Example VII 50 parts of the phosphated product of Example I (supra) are stirred into 950 parts of a lime base grease having a No. 1 consistency. The resulting product is a clear grease which is slightly softer in consistency but, otherwise, has the same general appearance as the original lime base grease. This product has excellent lubricity and is of value as a wire-drawing lubricant.

Considerable modification is possible in the methods employed in the preparation of the condensate and of the phosphated product, as well as in the compounding of lubricating compositions employing the phosphated amine condensation products, without departing from the essential features of the present invention.

We claim:

1. A single phase lubricating composition consisting essentially of a lubricant selected from the group consisting of mineral oil, a mixture of mineral oil and not more than about 50% of saponifiable oil based on the mineral oil and a mixture of mineral oil and not more than about 35% of a metal soap jelling agent, and from about 2% to about 25% of a phosphoric acid salt, soluble in said mineral oil, of a condensation product of one mol of an amine, selected from the group consisting of polyalkyleneamines having from three to five amino groups, alkylol amines having from two to three hydroxyl groups and alkylolpolyamines having from two to three amino groups, the alkylene and alkylol units having two to four carbon atoms, with two mols of a higher fatty acid selected from the group consisting of the acids whose formulae are represented by $C_nH_{2n+1}COOH$ wherein $n$ is at least 11, oleic, linoleic and ricinoleic acids.

2. A single phase lubricating composition consisting essentially of a lubricant selected from the group consisting of mineral oil, a mixture of mineral oil and not more than about 50% of saponifiable oil based on said mineral oil and a mixture of mineral oil and not more than about 35% of a metal soap jelling agent, and from about 2% to about 25% of a phosphoric acid salt, soluble in said mineral oil, of a condensation product of one mol of a polyethyleneamine having from three to five amino groups, with two mols of a higher fatty acid selected from the group consisting of the acids whose formulae are represented by $C_nH_{2n+1}COOH$ wherein $n$ is at least 11, oleic, linoleic and ricinoleic acids.

3. The composition of claim 2 wherein said condensation product is a non-cyclic condensation product.

4. The composition of claim 2 wherein said condensation product is a cyclic condensation product.

5. A single phase lubricating composition consisting essentially of a lubricant selected from the group consisting of mineral oil, a mixture of mineral oil and not more than about 50% of saponifiable oil based on the mineral oil and a mixture of mineral oil and not more than about 35% of a metal soap jelling agent, and from about 2% to about 25% of a phosphoric acid salt, soluble in said mineral oil, of a condensation product of one mol of an ethanolamine having two to three hydroxyl groups, with two mols of a higher fatty acid selected from the group consisting of the acids whose formulae are represented by $C_nH_{2n+1}COOH$ wherein $n$ is at least 11, oleic, linoleic and ricinoleic acids.

6. The composition of claim 5 wherein said condensation product is a non-cyclic condensation product.

7. The composition of claim 5 wherein said condensation product is a cyclic condensation product.

8. A single phase lubricating composition consisting essentially of a lubricant selected from the group consisting of mineral oil, a mixture of mineral oil and not more than about 50% of saponifiable oil based on said mineral oil and a mixture of mineral oil and not more than about 35% of a metal soap jelling agent, and from about 2% to about 25% of a phosphoric acid salt, soluble in said mineral oil, of a condensation product of one mol of an ethanolpolyamine having two to three amino groups with two mols of a higher fatty acid selected from the group consisting of the acids whose formulae are representd by $C_nH_{2n+1}COOH$ wherein $n$ is at least 11, oleic, linoleic and ricinoleic acids.

9. The condensation of claim 8 wherein said condensation product is a non-cyclic condensation product.

10. The composition of claim 8 wherein said condensation product is a cyclic condensation product.

11. A single phase lubricating composition consisting essentially of a lubricant selected from the group consisting of mineral oil, a mixture of mineral oil and not more than about 50% of saponifiable oil based on said mineral oil and a mixture of mineral oil and not more than about 35% of a metal soap jelling agent, and from about 2% to about 25% of a phosphoric acid salt, soluble in said mineral oil, of a non-cyclic condensation product of one mol of triethanolamine with two mols of oleic acid.

12. A single phase lubricating composition consisting essentially of a lubricant selected from the group consisting of mineral oil, a mixture of mineral oil and not more than about 50% of saponifiable oil based on said mineral oil and a mixture of mineral oil and not more than about 35% of a metal soap jelling agent, and from about 2% to about 25% of a phosphoric acid salt, soluble in said mineral oil, of a non-cyclic condensation product of one mol of diethylenetriamine with two mols of talloil fatty acids.

13. A single phase lubricating composition consisting essentially of a lubricant selected from the group consisting of mineral oil, a mixture of mineral oil and not more than about 50% of saponifiable oil based on said mineral oil and a mixture of mineral oil and not more than about 35% of a metal soap jelling agent, and from about 2% to about 25% of a phosphoric acid salt, soluble in said mineral oil, of a non-cyclic condensation product of one mol of triethanolamine with two mols of talloil fatty acids.

SIDNEY J. BARBER.
JAMES T. EATON.

REFERENCES CITED

The following references are of record in the file of this patent:

UNITED STATES PATENTS

| Number | Name | Date |
|---|---|---|
| 2,018,758 | Ellis | Oct. 29, 1935 |
| 2,167,867 | Benning | Aug. 1, 1939 |
| 2,205,042 | Lenher et al. | June 18, 1940 |
| 2,206,090 | Haggenmacher | July 2, 1940 |
| 2,233,001 | Dickey | Feb. 25, 1941 |
| 2,286,794 | Dickey | June 16, 1942 |
| 2,291,396 | Lieber | July 28, 1942 |
| 2,303,366 | Katzman | Dec. 1, 1942 |
| 2,340,881 | Kelley et al. | Feb. 8, 1944 |
| 2,355,837 | Wilson | Aug. 15, 1944 |
| 2,371,656 | Smith | Mar. 20, 1945 |

Certificate of Correction

October 11, 1949

Patent No. 2,484,146

SIDNEY J. BARBER ET AL.

It is hereby certified that errors appear in the printed specification of the above numbered patent requiring correction as follows:

Column 1, line 26, after the word and period "hindrance." insert the following paragraph—

*It is further known that fatty acid phosphates, such, for instance, as lauryl dihydrogen phosphate, have excellent properties from the viewpoint of increasing the film strength of lubricants, particularly mineral oils and combinations of mineral oils with fats. However, these fatty alcohol phosphates, in order to be effective, must be used under rather highly acidic conditions which are often quite objectionable. If the phosphated fatty alcohols are neutralized to prevent this acid condition, they lose their desirable properties to a very large degree. A further disadvantage of the fatty alcohol phosphates is the high cost thereof which makes them unfeasible from a practical standpoint for the usual cutting or metal-forming applications. Another disadvantage of these materials resides in the fact that their properties as film-strengthening agents are markedly diminished when they are used in concentrations sufficiently high to give a reasonably long life to products containing them.* column 1, line 44, after "base" insert *grease, and to which has had imparted*; column 3, line 10, for "1,3-propandial" read *1,3-propandiol*; column 10, line 45, for "condensation" read *composition*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*